(12) United States Patent
Dance et al.

(10) Patent No.: US 10,509,659 B1
(45) Date of Patent: Dec. 17, 2019

(54) INPUT PROCESSING LOGIC TO PRODUCE OUTPUTS FOR DOWNSTREAM SYSTEMS USING CONFIGURATIONS

(71) Applicant: Amazon Technologies, Inc., Seattle, WA (US)

(72) Inventors: Douglas Dance, Kent, WA (US); Mark Hjelm, Issaquah, WA (US); Yu Liu, Bellevue, WA (US); Vivek Mehta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 15/278,707

(22) Filed: Sep. 28, 2016

(51) Int. Cl.
*G06F 1/24* (2006.01)
*G06F 9/00* (2006.01)
*G06F 9/445* (2018.01)
*G06F 9/46* (2006.01)

(52) U.S. Cl.
CPC .......... *G06F 9/44505* (2013.01); *G06F 9/466* (2013.01)

(58) Field of Classification Search
CPC ........................................................ G06F 9/44
See application file for complete search history.

(56) References Cited

U.S. PATENT DOCUMENTS

| | | | |
|---|---|---|---|
| 9,195,939 B1* | 11/2015 | Goyal | G06N 5/02 |
| 2014/0109020 A1* | 4/2014 | Wielgosz | G06F 3/04883 715/863 |
| 2015/0127431 A1* | 5/2015 | Thomas | G06Q 10/06393 705/7.39 |
| 2017/0063814 A1* | 3/2017 | Wachs | H04L 9/0643 |
| 2017/0187686 A1* | 6/2017 | Shaikh | H04L 63/0263 |
| 2017/0364705 A1* | 12/2017 | Villars | G06F 21/6227 |
| 2018/0046239 A1* | 2/2018 | Schneider | G06F 1/266 |
| 2018/0053086 A1* | 2/2018 | Liu | G06N 3/0481 |
| 2018/0062666 A1* | 3/2018 | Zhang | H03M 13/114 |

* cited by examiner

*Primary Examiner* — Mohammed H Rehman
(74) *Attorney, Agent, or Firm* — Thomas | Horstemeyer, LLP

(57) ABSTRACT

A system tasked with processing inputs and generating outputs, such as a transaction processor, might have many users. Updates to a particular user's use case can require an update to the code of the system. Examples of this disclosure provide a mechanism by which configuration can be employed to update output logic rather than code, which can facilitate updating and roll-out.

20 Claims, 10 Drawing Sheets

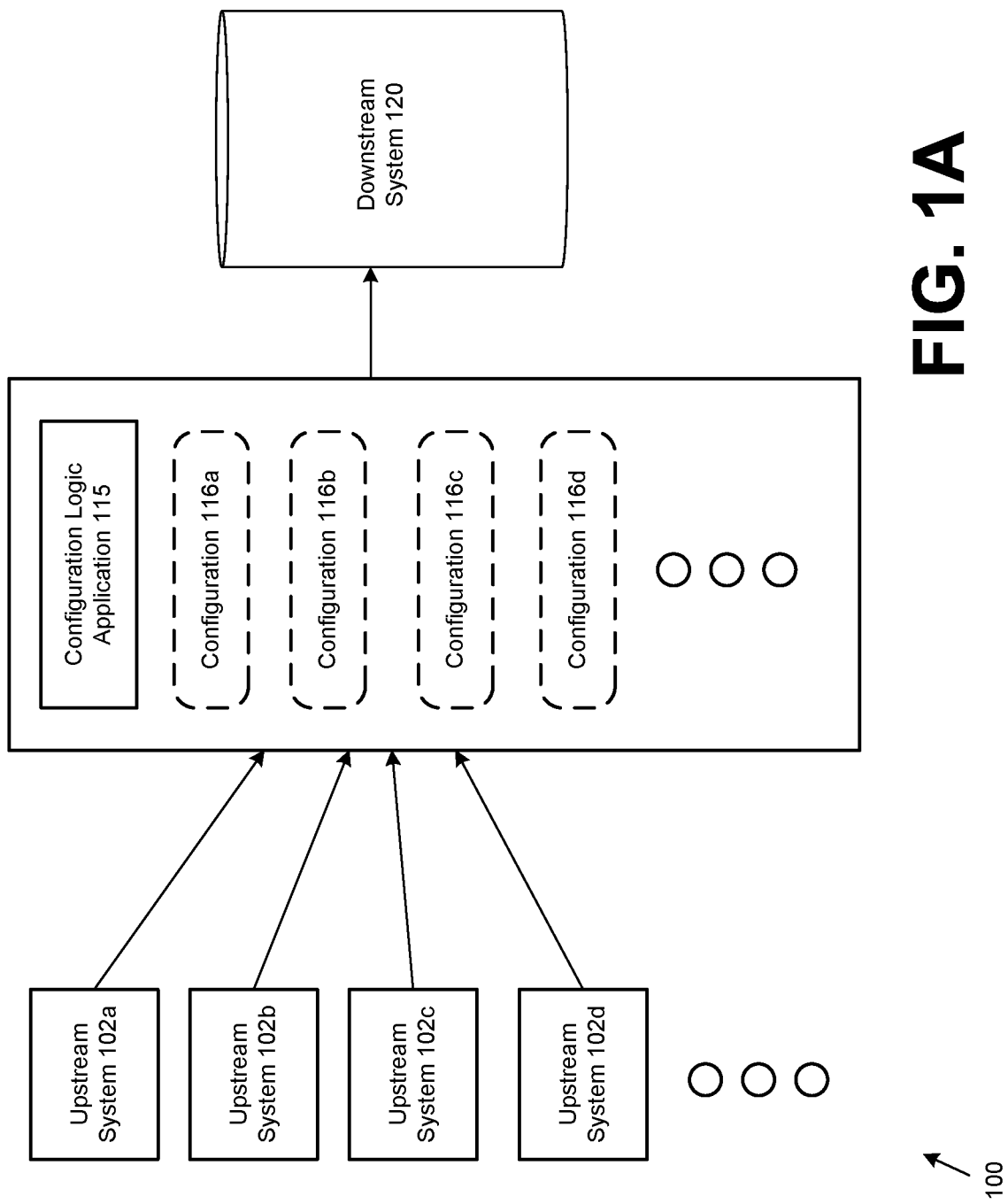

INPUT PROCESSING LOGIC TO PRODUCE OUTPUTS FOR DOWNSTREAM SYSTEMS USING CONFIGURATIONS

BACKGROUND

In many computing environments implemented in large organizations, various entities within the organization can leverage systems that are created and/or maintained by different entities. For example, in a business, one group may maintain a general ledger database while another group may maintain a transaction processing front-end system. These two systems might require communication with one another. A user of the transaction processing system might require rules or logic to be implemented within the general ledger system to satisfy certain use-cases or requirements. However, implementation, testing and roll-out of necessary code updates to the general ledger system can be a laborious or time-consuming process that relies upon the organization maintaining the system to complete.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1A-1B is an example diagram according to embodiments of the disclosure.

DETAILED DESCRIPTION

Figure 1B:
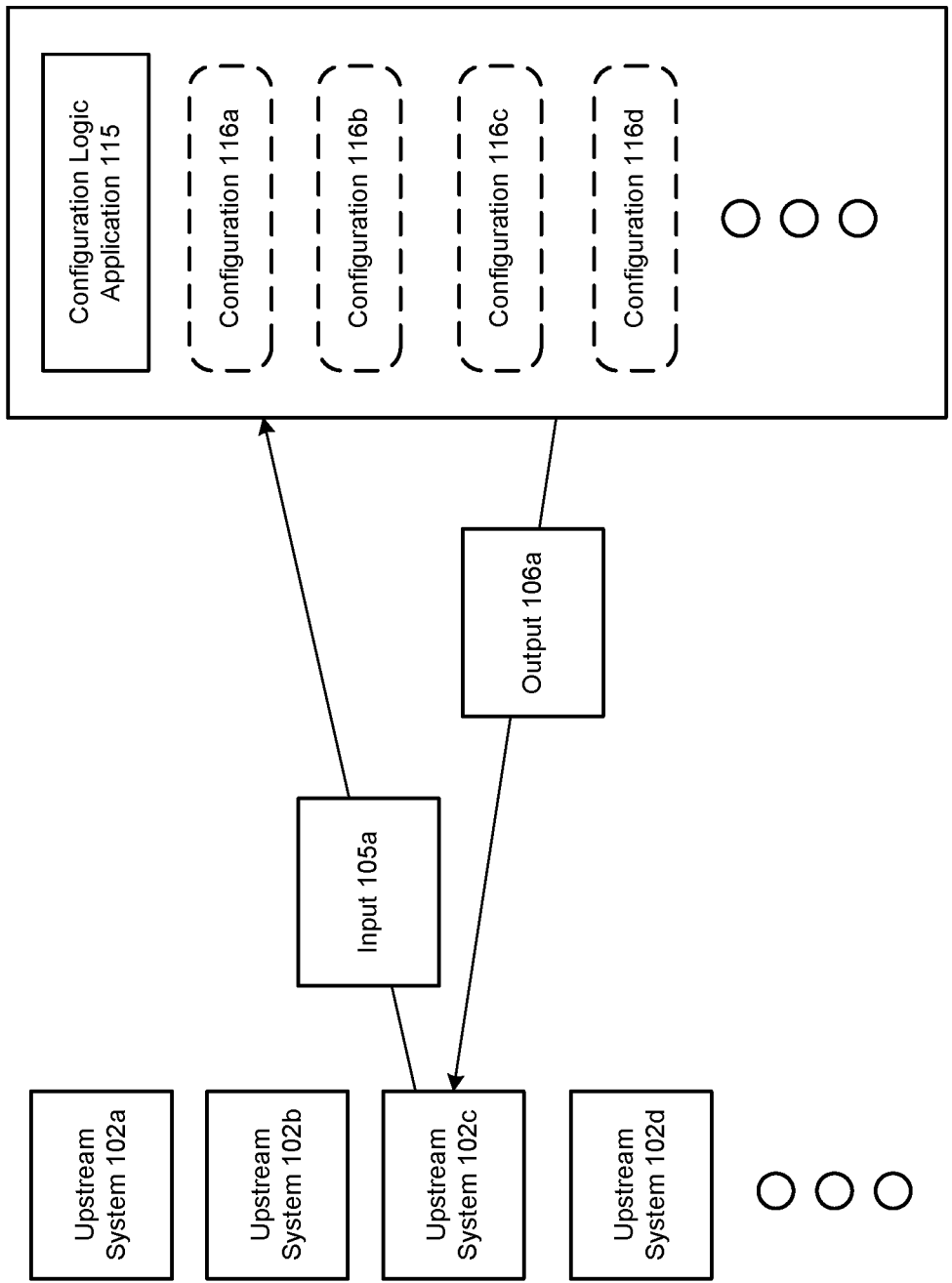

The present application is directed to data processing platform that utilizes configuration rather than code to instruct the platform how to generate an output. In many enterprise environments, processing logic that directs a system how to generate a particular output or result is often implemented in code. In other words, one or more programmers implement processing logic that directs the system how to generate a particular output in a particular code environment, and these changes are then incorporated into an application or platform release. For example, the code is written, tested, compiled and then released into an application or service that is distributed to the various users of the platform.

Accordingly, for users who require that updates or changes to processing logic to be made, they often have to await an organization maintaining and/or coding a particular platform to make requested updates. This can be an inefficient process that requires users to wait an inordinate amount of time for updates to be made to the system. In some platforms, a plug-in interface is provided where upstream users of a system can author their own plugins to a data processing platform a system in which the processing logic for their particular use-cases reside. However, again, this requires the upstream users to author a plug-in using a particular application programming interface (API), which requires software development and coding resources that the upstream users may not possess.

Therefore, examples of this disclosure allow upstream users to provide processing logic using configuration, or configuration files, rather than in code, whether the code is implemented completely within the data processing platform or using a plug-in interface. In other words, processing logic can be provided in a configuration file that is separate from the code of the applications or services powering the platform. A configuration file can identify various conditions with respect to an input provided by an upstream system so that a configuration logic application 115 can identify a particular configuration that should be used for the input from many configurations stored.

Turning to FIG. 1A, shown is an example scenario 100 according to embodiments of the disclosure. In the example scenario 100, shown are various upstream systems 102 that can submit inputs to the configuration logic application 115. The configuration logic application 115 can be an application or service that is tasked with receiving an input, processing the input, and producing an output. The output can be transmitted or stored in a downstream system 120. The downstream system 120 can be a data store, or another application or service that can receive and/or process an output generated by the configuration logic application 115. For example, the configuration logic application 115 can be tasked with generating transaction records in response to a request submitted by an upstream system 102 to an API provided by the configuration logic application 115. The upstream system 102, in one example, can be a payments processing system that processes payments and then submits a request downstream systems for further processing of the payment.

In response to receiving a particular request, the configuration logic application 115 can generate a transaction record that is sent to the downstream system 120. The downstream system 120 can be a general ledger system, an enterprise database, or another system can receives transaction records generated by the configuration logic application 115. The configuration logic application 115 can identify a particular configuration 116 that should be applied to the input based upon conditions, fields, or other variables or parameters associated with the input. The configuration can be stored in a file that is separate from the code that comprises the configuration logic application 115. In other words, the configuration logic application 115 can be executable code that is instrumented to import a file containing a configuration 116. The configuration 116 then processing logic that instructs the configuration logic application 115 how to generate an output that is provided to a downstream system 120.

In this way, by employing a configuration 116 to include the input processing logic, users of the configuration logic application 115 can roll out configurations 116 in a much more rapid fashion than if the system relied upon code to include the input processing logic. This can facilitate scaling of the configuration logic application 115 within large organization with many users of the system, each of which might different configurations 116 that define particular inputs and particular logic to generate an output from an input. The various users might have different configurations 116 that specify different downstream systems 120 to which a particular output should be transmitted as well. An updated configuration 116 can be deployed to the configuration logic application 115 and applied at a next run-time, or the next time an input matching the configuration 116 is received by the system.

FIG. 1B presents an alternative scenario in which an upstream system 102 can provide an input 105 to the configuration logic application 115. In response to receiving the input 105, the configuration logic application 105 can identify an appropriate configuration 116 that corresponds to the input 105 based upon the conditions stored within the input 105. The configuration logic application 115 can then produce an output 106 that is returned back to the requesting upstream system 102. In this scenario, the requesting upstream system 102 can generate another output for a downstream system 120 instead of the configuration logic application 115 if such an output is needed.

Figure 2:
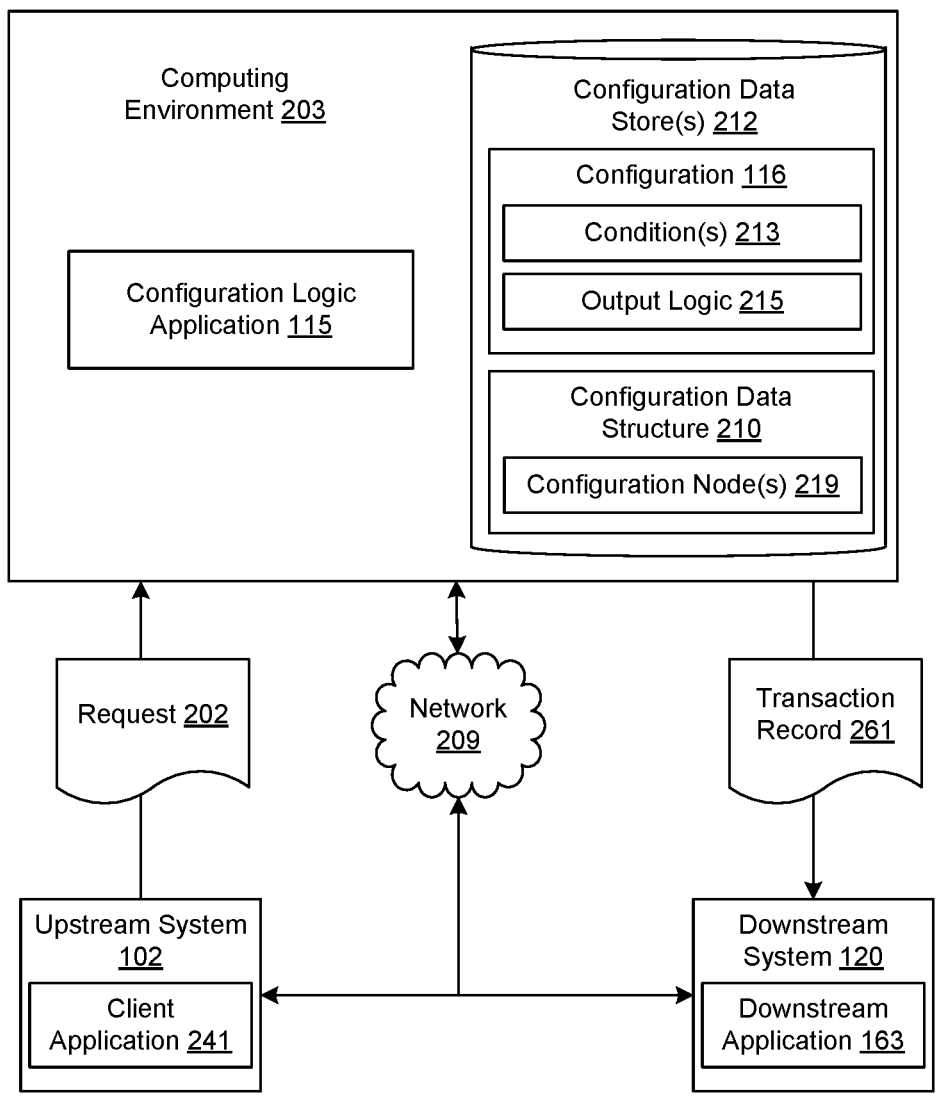
FIG. 2 is a block diagram of a networked environment according to various embodiments of the present disclosure.

With reference to FIG. 2, shown is a networked environment 200 according to various embodiments. The networked environment 200 includes a computing environment 203, one or more upstream system 102, and one or more downstream system 120 in communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks. In some examples, the computing environment 203 can include the upstream systems 102 and/or downstream systems 120 in a common computing environment 203.

The computing environment 203 can comprise, for example, a server computer or any other system providing computing capability. Alternatively, the computing environment 203 can employ a plurality of computing devices that can be arranged, for example, in one or more server banks, computer banks, or other arrangements. Such computing devices can be located in a single installation or may be distributed among many different geographical locations. For example, the computing environment 203 can include a plurality of computing devices that together can comprise a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

Various applications and/or other functionality can be executed in the computing environment 203. Also, various data is stored in a configuration data store 212 that is accessible to the computing environment 203. The configuration data store 212 can be representative of a plurality of configuration data stores 212. The data stored in the configuration data store 212, for example, is associated with the operation of the various applications and/or functional entities described below.

The components executed on the computing environment 203, for example, include a configuration logic application 115 and other applications, services, processes, systems, engines, or functionality not discussed in detail herein. The configuration logic application 115 is executed to serve requests from upstream systems 102 to produce an output in response to a particular input. For example, the upstream system 102 can be a system within a larger enterprise that performs particular functions and the configuration logic application 115 can process requests from these upstream systems 102 to produce an output in a particular format or with particular data to be provided to downstream systems 120. Therefore, in one example, the configuration logic application 115 can take the form of a transaction processor that generates transaction records for downstream systems 120.

For example, an upstream system 102 can include an ordering system, a payments system, a digital goods system, an inventory system, or any other data that might need data processed and an output, such as a transaction record 261, to be created and sent to a downstream system 120.

The data stored in the configuration data store 212 includes, for example, configurations 116 and one or more configuration data structure 210. The configuration data store 212 represents mass storage or any other storage resource that can be written to or updated without requiring the configuration logic application 115 to be updated. The configurations 116 can represent files that contain logic specifying how a particular output should be generated from a request 202 provided by an upstream system 102 to the configuration logic application 115. A configuration 116 can identify the data that should be present within a particular input as well as how to generate and/or format an output that should be generated from the input. In one example, a configuration 116 can include various conditions that should be included in an input that is associated with the configuration 116. For example, the configuration 116 can specify one or more fields or parameters that must be present within a request 202 in order for an output to be processed by the configuration logic application 115 using the request 202.

The configuration 116 can also include data that should be generated and/or included in an output or transaction record 261. In one example, a formatting language can be employed that allows for conditional logic to be included within a configuration 116. For example, the configuration 116 can specify that if a request 202 includes a particular parameter that a first output should be generated but if the request 202 includes a different parameter, then a second output should be generated. The configuration 116 can also allow data types to be defined and data transformations to be specified by a user and performed by the configuration logic application 115. Other examples of information that can be embedded within a configuration 116 are provided below.

In one example, a configuration 116 can include one or more conditions 213. Conditions 213 can specify the data should be present in a particular input that is associated with the configuration 116. The conditions 213 can also identify that data that should be present in an input so that the configuration logic application 115 can identify the correct configuration 116 from a plurality of configurations 116 stored in the configuration data store 212. A configuration 116 can also include output logic 215. Output logic 215 can specify how an input should be processed or transformed into an output, such as a transaction record 261. In one example, the output logic 215 can identify data that should be appended to, included within, or otherwise added to an input to create an output for a downstream system 120. In another example, the output logic 215 can specify error messages, informational messages, field properties, or other aspects of the fields of an output that is sent to a downstream system 120. In some cases, a configuration 116 can also include input validation logic. Input validation logic can be applied by the configuration logic application 115 to validate an input received by the configuration logic application 115.

For example, the input validation logic can specify that a certain input type is required or that a certain input be formatted in a certain way or have a certain data type. The input validation logic can specify that an error be returned to a requesting system or that a particular input be modified or corrected to comply with requirements specified in the input validation logic.

The configuration data structure 210 can be a data structure into which the various configurations 116 stored in the configuration data store 212 are organized. In one example, such a data structure can be a tree data structure. The configurations 116 can be stored into the configuration data structure 210 based upon the relationship of the conditions 213 in the configurations 116 to one another. In one sense, the configurations 116 can be thought of as certain configuration nodes 219 on a tree data structure that comprises the configuration data structure 210. In some examples, each configuration node 219 does not represent a particular configuration 116. Some configuration nodes 219 can include a category or namespace within which configurations 116 exist. Accordingly, in one scenario, the actual configurations 116 exist as leaf nodes on a tree data structure while its parent nodes are conditions 213 of the configuration 116 that allow the configuration 116 to be found by a process that is traversing a tree data structure. The arrangement and organization of configurations 116 within the configuration data structure 210 is discussed in more detail in the discussion of FIGS. 3-4.

The upstream system 102 and downstream system 120 are representative of one or more computing devices or computing environments that can be coupled to the network 209. The upstream system 102 represents a computing device or computing environment executing a client application 241 that generates requests 202 sent to the configuration logic application 115. The requests 202 can be formatted by the client application 241 in a markup language that can be parsed by the configuration logic application 115.

The downstream system 120 represents a computing device or computing environment executing a downstream application 163. For example, the downstream application 163 can represent a system into which transaction records 261 can be stored or processed. In one example, the downstream application 163 can represent a general ledger or archival system to which the configuration logic application 115 can send transaction records 261. As another example, the downstream application 163 can represent a deferral calculation engine that can perform deferred event or deferred revenue calculations in response to a transaction record 261 corresponding to a transaction that occurred in an upstream system 102.

In another example, the upstream system 102 can represent an application that reports activity occurring within the application to the configuration logic application 115, which can generate a transaction record 261 corresponding to an activity log. The activity log can be sent to the downstream system 120, which can be a logging system. The downstream application 163 can archive the activity log into a data store or even send the activity log to another downstream system 120.

Next, additional discussion follows for how the configuration logic application 115 can generate outputs, or transaction records 261, by processing a request 202 from an upstream system 102. As noted above, the configuration logic application 115 can rely upon configurations 116 rather than code to determine how to process an input, such as a request 202. The configurations 116 can be provided or updated by user without updating the configuration logic application 115.

Figure 3A:
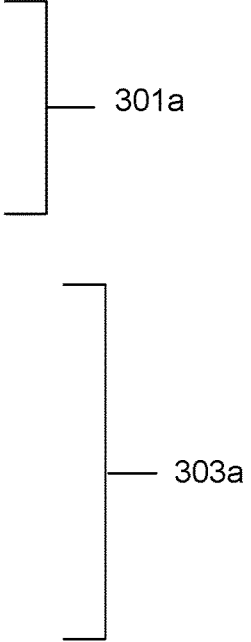
FIGS. 3A-3B illustrate example configurations according to various embodiments of the present disclosure.
Figure 3A:

Reference is now made to FIG. 3A, which illustrates an example of a configuration 116 that can be provided to the configuration logic application 115 and stored in the configuration data store 112. In the depicted example, one or more conditions 301 can be defined within the configuration 116a. The conditions 301 can provide one or more requirements that the configuration logic application 115 can use to identify an input that corresponds to this particular configuration 116a. For example, the configuration logic application 115 can identify inputs having a "type" parameter with the value specified in the configuration 116, a "country" parameter with the specified value, and an "activity" parameter with the specific value. If such an input is received by the configuration logic application 115, the configuration logic application 115 can produce an input according to the output logic 303 that is also specified in the configuration 116.

In the example of FIG. 3A, the configuration 116a can instruct the configuration logic application 115 to generate an output that appends the parameters and parameter values shown in the output logic 303 to a particular input record. The output logic 303 can also designate certain attributes as searchable in an output generated by the configuration logic application 115.

In some examples, the output logic 303 can also specify an attribute that should be included in an output that is derived from a particular input attribute or from another source. In other examples, the output logic 303 can specify a first output in response to a first input attribute and a second output in response to another input attribute.

The conditions 301 in the configuration 116a can also be used by the configuration logic application 115 to categorize and place the configuration 116a within the configuration data structure 210, which can be implemented as a tree data structure. Accordingly, each of the parameters in the conditions 301 can be associated with a configuration node 219. Each of the parameter values in the conditions 301 can also respectively be associated with configuration nodes 219 in the configuration data structure 210. Accordingly, the configuration logic application 115 can organize the various configurations 116 in the configuration data store 112 into a tree data structure by identifying those configurations 116 having commonly named conditions 213 and grouping the commonly named conditions 213 into a configuration node 219. The actual configuration 116, including the output logic 215, can be located at a leaf node of the tree data structure.

Figure 3B:
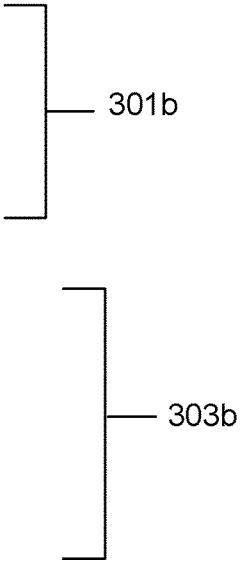
Figure 3B:

Reference is now made to FIG. 3B, which illustrates an alternative example of a configuration 116b that can be provided to the configuration logic application 115 and stored in the configuration data store 112. The configuration 116b in FIG. 3B illustrates how the configuration logic application 115 can leverage configurations 116b having various conditions 301b and various output logic 303b.

Figure 4A:
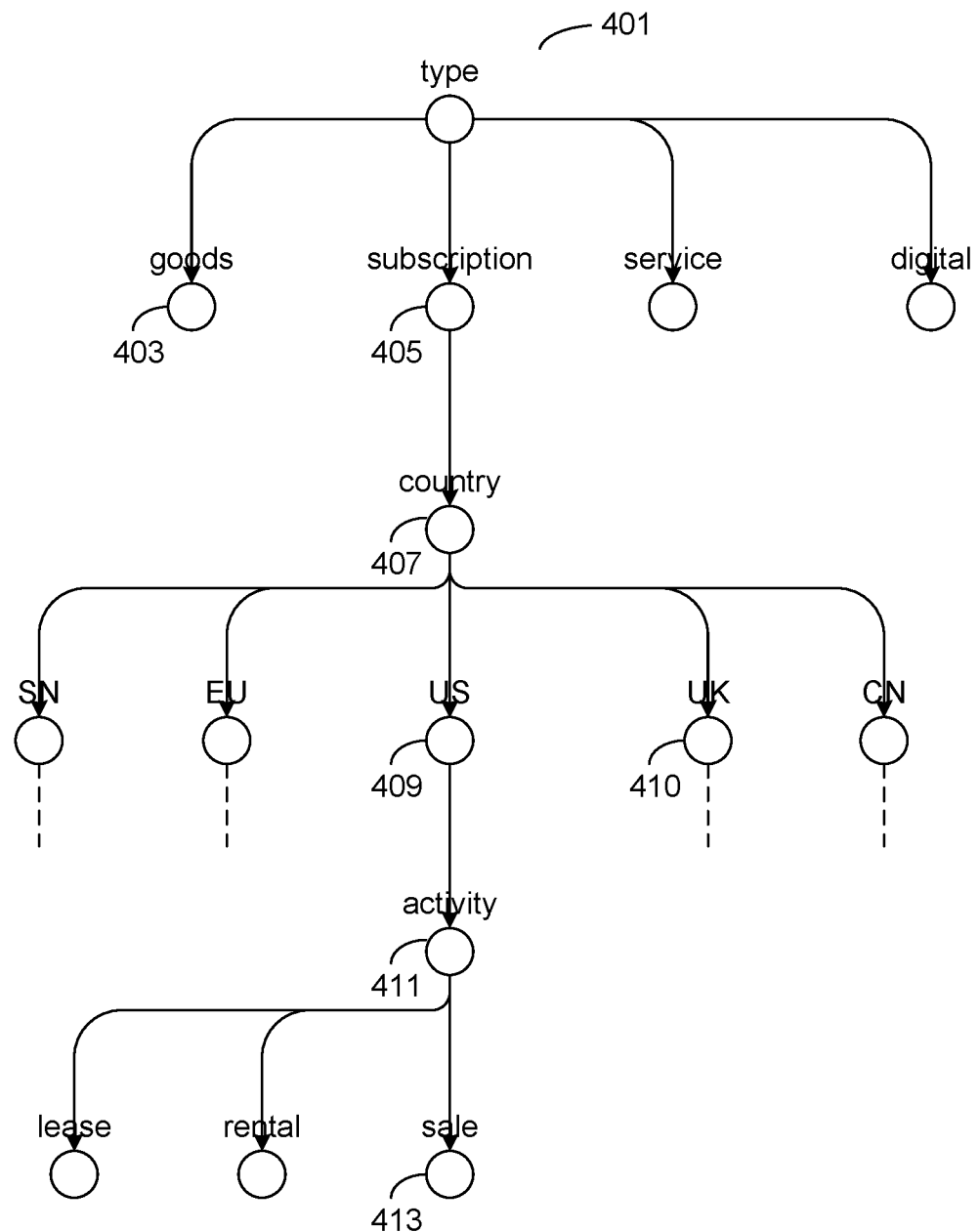
FIGS. 4A-4B illustrate example configurations according to various embodiments of the present disclosure.

To illustrate organization of a configuration 116 into a configuration data structure 210, reference is now made to FIG. 4A. The example of FIG. 4A illustrates a portion of a configuration data structure 210 into which various configurations 116a can be categorized. The configuration 116a of FIG. 3A can be used as an example to illustrate this categorization and/or organization into a configuration data structure 210.

The conditions 301a in the configuration 116a of FIG. 3 can be used to identify configuration nodes 219. A particular parameter, such as "type" can be a configuration node 219 under which the various possible values of the parameter also exist as configuration nodes 219 that are child nodes under their respective parameter. In the example of FIG. 4A, node 401 is associated with the "type" condition and the possible parameter values of the parameter or condition, e.g., nodes 403 and 405, are organized as child nodes of node 401. Node 407 is associated with the parameter "country" and nodes 409 and 410, etc., as possible parameter values of the "country" parameter, are child nodes of node 407. The next condition, parameter "activity," is associated with node 411 and node 413 and its other peer nodes are possible parameter values for the parameter. Each node of the tree can house a portion of the output logic 303b of the configuration 116b. For example, output logic stored at node 407 can be applied to all inputs that satisfy the conditions 301 to that point in the tree. Output logic stored at node 413 is applied to inputs that satisfy the additional conditions 301 further into the tree data structure.

Figure 4B:
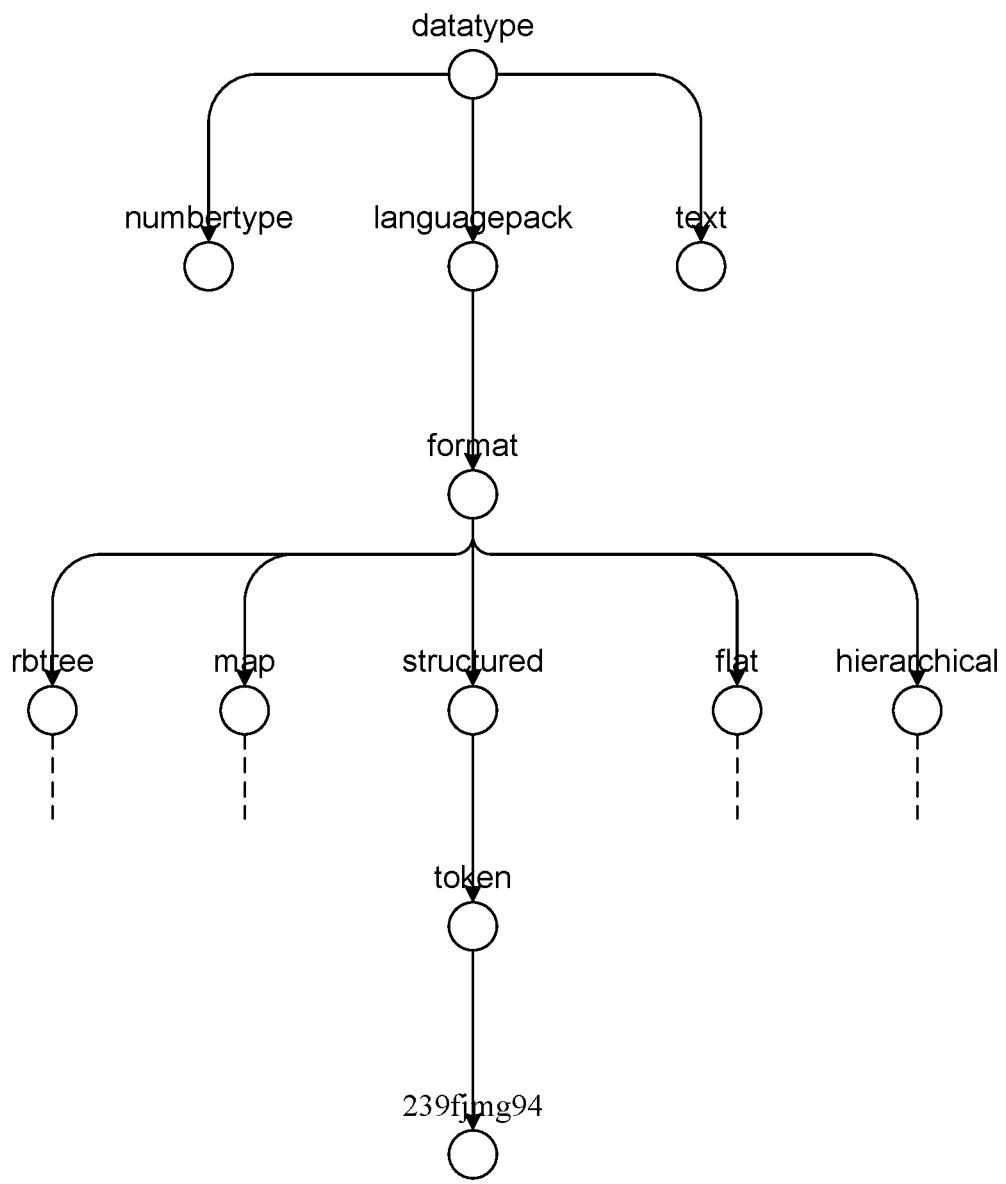

To illustrate an alternative example of organization of a configuration 116 into a configuration data structure 210, reference is now made to FIG. 4B. The example of FIG. 4B illustrates a portion of a configuration data structure 210 into which configuration 116b from FIG. 3B can be categorized.

Accordingly, by organizing the configurations 116 into a tree data structure, the configuration logic application 115 can quickly identify a particular configuration that applies to a particular request 202. The configuration logic application 115 can identify the highest level node in the tree that corresponds to a condition in the request 202. The configuration logic application 115 can then identify a child node of the highest level node that corresponds to a parameter value associated with the condition in the request 202. The configuration logic application 115 can then navigate the tree data structure by locating the parameters and parameter values that are in the request until it has located the configuration 116 that should be applied to the input in the request 202. If no configuration 116 or configuration node 219 corresponds to the conditions in the request, the configuration logic application 115 can return an error. Upon arriving at the configuration 116 in a leaf node of the tree, the configuration logic application 115 can apply the output logic 215 in the configuration 116.

A user can author or edit a configuration 116 and submit the configuration 116 to the configuration logic application 115. In one example, a textual representation of a configuration 116 can be edited or authored by a user and the configuration logic application 115 can traverse the tree data structure to determine where to place the configuration 116. In one scenario, a configuration 116 corresponding to the conditions 213 in a particular submission from a user already exists in the configuration data structure 210. In this scenario, the configuration logic application 115 can replace the configuration 116 that exists at the particular configuration node 219 in the tree. In one example, a configuration 116 submitted by a user to the configuration logic application 115 can be associated with an effective date on or after which the configuration 116 should be considered effective by the configuration logic application 115. In this example, the configuration 116 can be stored alongside or within the previous configuration 116 until the effective date.

The configuration logic application 115 can also generate testing modules or test cases for configurations 116 that are stored in the configuration data store 112. In order to generate a test case, the configuration logic application 115 can analyze a particular configuration and determine the various inputs that are defined by the configuration. The configuration logic application 115 can then generate a test input that includes the required inputs for the configuration 116.

The configuration logic application 115 can also execute a test case by generating a test output from the test input. The test output can be provided by a user through a user interface so that a user authoring or overseeing a particular configuration 116 can determine whether the configuration 116 should be submitted to the configuration logic application 115 to replace a preexisting configuration 116.

In some examples, the configuration logic application 115 can provide a test user interface so that test cases can be executed and test outputs can be reviewed. In some scenarios, the test outputs can be provided to a particular user account having sign-off authority on updates to a particular configuration 116, and the configuration logic application 115 can await approval of such a user before storing a submitted configuration 116 in the configuration data structure 210.

In some scenarios, the configuration logic application 115 can also store the configuration data structure 210 such that it is paginated. Therefore, when the configuration logic application 115 traverses the configuration data structure 210, it can obtain slices of the configuration data structure 210 according to a page input value and traverse the tree in a piecemeal fashion rather than obtaining the entire configuration data structure 210 at once. In one example, each node of the configuration data structure 210 can be associated with a page number and then configuration logic application 115 can request a page or multiple pages at a time rather than the entire configuration data structure 210 at once, which can allow the tree to be traversed more quickly.

Figure 5:
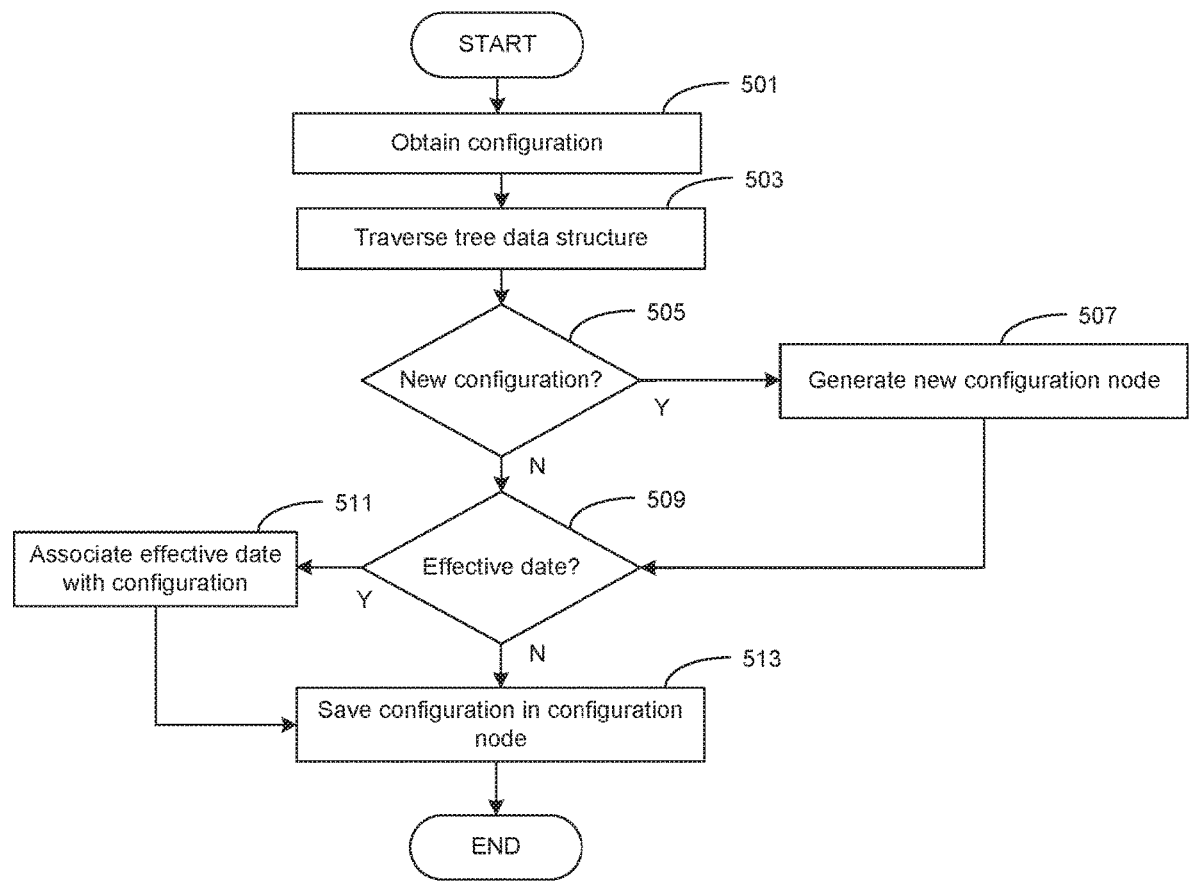
FIGS. 5-6 are flowcharts illustrating examples of functionality implemented as portions of a computing environment in the networked environment of FIG. 2 according to various embodiments of the present disclosure.

Referring next to FIG. 5, shown is a flowchart that provides one example of the operation of a portion of the configuration logic application 115 according to various embodiments. It is understood that the flowchart of FIG. 5 provides merely an example of the many different types of functional arrangements that may be employed to implement the operation of the portion of the configuration logic application 115 as described herein. As an alternative, the flowchart of FIG. 5 can be viewed as depicting an example of elements of a method implemented in the computing environment 203 according to one or more embodiments. FIG. 5 illustrates an example of how the configuration logic application 115 can associate a configuration 116 provided by a user with a configuration data structure 210, thereby updating output processing logic without requiring an update to the code of the configuration logic application 115.

Beginning with box 501, the configuration logic application 115 can obtain a configuration 116. The configuration 116 can be obtained via an application programming interface (API) through which new configurations 116 can be submitted. In some cases, the configuration logic application 115 can allow a user to visualize the tree or configuration data structure 210, and then edit or add a particular configuration node 219 to the tree. In either scenario, upon obtaining a configuration 116, the configuration logic application 115 can traverse the configuration data structure 210 using the conditions specified within the configuration 116 to determine a location within the tree for the configuration 116.

At box 505, upon traversing the tree based upon the conditions within the configuration 116, the configuration logic application 115 can then determine whether the configuration 116 is a new configuration 116 that has not been previously submitted to the configuration data store 112. The configuration logic application 115 can make the determination of whether the configuration 116 is a new configuration by traversing the configuration data structure 210 using the conditions 213 in the submitted configuration 116 and determining whether a new configuration node 219 is required. If the submitted configuration 116 is a new configuration 116, the process proceeds to box 507, where the configuration logic application 115 generates a new configuration node 219 or nodes corresponding to the conditions 213 in the submitted configuration 116. For example, in certain cases, there could be multiple conditions 213 for which configuration nodes 219 do not exist within the configuration data structure 210. In this scenario, the configuration logic application 115 would create multiple new configuration nodes 219 corresponding to the conditions 213.

From box 505 or 507, the process can proceed to box 509, where the configuration logic application 115 determines whether the configuration 116 submission is associated with an effective date on or after which the configuration 116 is effective or should be used by the configuration logic application 115. As noted above, a configuration 116 update or newly submitted configuration 116 can include an effective date on or after which the configuration 116 should be used by the configuration logic application 115 for inputs having the conditions 213 corresponding to the configuration 116. If the configuration 116 has an effective date, the process can proceed to box 511, where the configuration logic application 115 associates the effective date with the configuration 116. In some examples, the configuration logic application 115 can generate a new configuration node 219 for the configuration 116 as a peer or child node until the effective date. In other examples, the configuration logic application 115 can store the configuration 116 with the effective date within the same configuration node 219 and replace the preexisting configuration 116 on or after the effective date. The process can proceed from box 509 or 511 to box 513, where the configuration logic application 115 can save the configuration within the appropriate configuration node 219. Thereafter, the process proceeds to completion.

Figure 6:
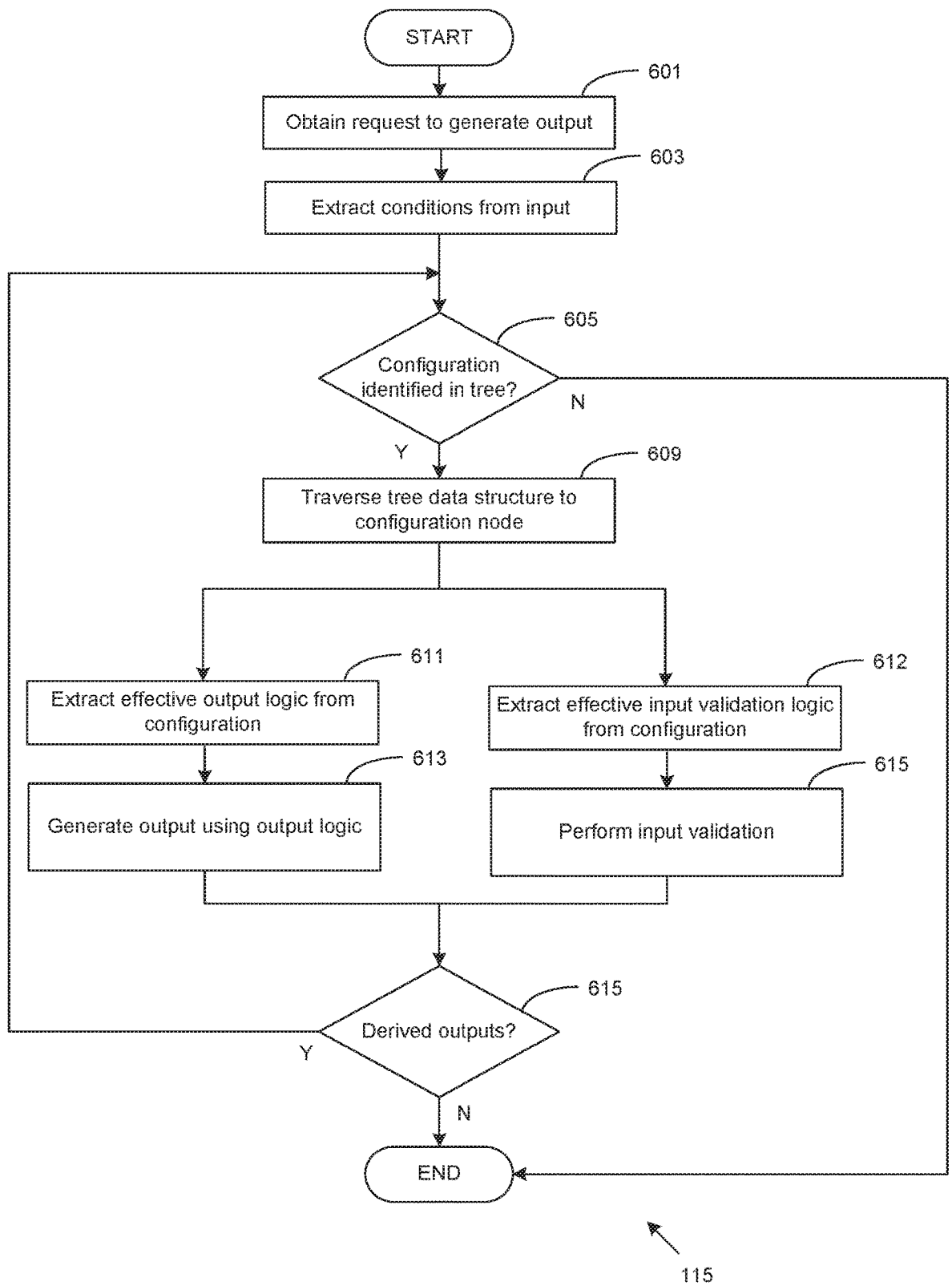

Referring next to FIG. 6, shown is a flowchart that provides one example of the operation of a portion of the configuration logic application 115 according to various embodiments. It is understood that the flowchart of FIG. 6 provides merely an example of the many different types of functional arrangements that may be employed to implement the operation of the portion of the configuration logic application 115 as described herein. As an alternative, the flowchart of FIG. 6 can be viewed as depicting an example of elements of a method implemented in the computing environment 203 according to one or more embodiments. FIG. 6 illustrates an example of how the configuration logic application 115 can process an input to produce an output relying on configurations 116 stored in the configuration data store 112.

At box 601, the configuration logic application 115 can obtain a request to generate an output, such as a transaction record, in response to a provided input. At box 603, the configuration logic application 115 can extract the conditions provided in the request or input. In one example, the configuration logic application 115 can extract the conditions in the request by identifying parameters and parameter values within markup language tags or other designations according to a particular markup language format.

At box 605, the configuration logic application 115 can traverse the configuration data structure 210 using the extracted conditions and attempt to locate a configuration node 219 having a configuration 116 that corresponds to the extracted conditions 213. If no configuration node 219 can be found, the process can proceed to completion. In some cases, if no configuration node 219 can be found, the configuration logic application 115 can return an error to the requesting system.

If, at box 605, a configuration 116 can be found, navigates to the configuration node 219 at box 609. In some cases, the configuration node 219 can express output logic. In other scenarios, the configuration node 219 can express input validation logic. In some cases, the configuration node 219 can express both, in which case both parallel branches of the flowchart beginning with boxes 611 and 612 are followed. If the configuration node 219 expresses output logic, the process proceeds to box 611. At box 611, the configuration logic application 115 extracts the currently effective output logic 215 from the configuration 116 that corresponds to the configuration node 219. At box 613, the configuration logic application 115 generates an output as specified and directed by the configuration 116 output logic 215.

At box 612, the configuration logic application 215 can extract the then effective input validation logic from the configuration 116. At box 615, the configuration logic application 115 can perform input validation using input validation logic expressed in the configuration 116. In some scenarios, the input validation logic might require that an error be returned to the requesting upstream system 102 if certain inputs or data are not present in the received input. In other scenarios, the input validation logic might require that certain parameters be modified or corrected to comply with input requirements.

At box 615, the configuration logic application 115 can determine whether the output generated by the output logic 215 has resulted in derived outputs that require an additional iteration to determine whether an additional configuration 116 might apply to the output. If the configuration logic application 115 can determine that derived outputs have been generated, the process can return to box 605, where the configuration logic application 115 can determine whether another configuration 116 should be applied to the output.

Figure 7:
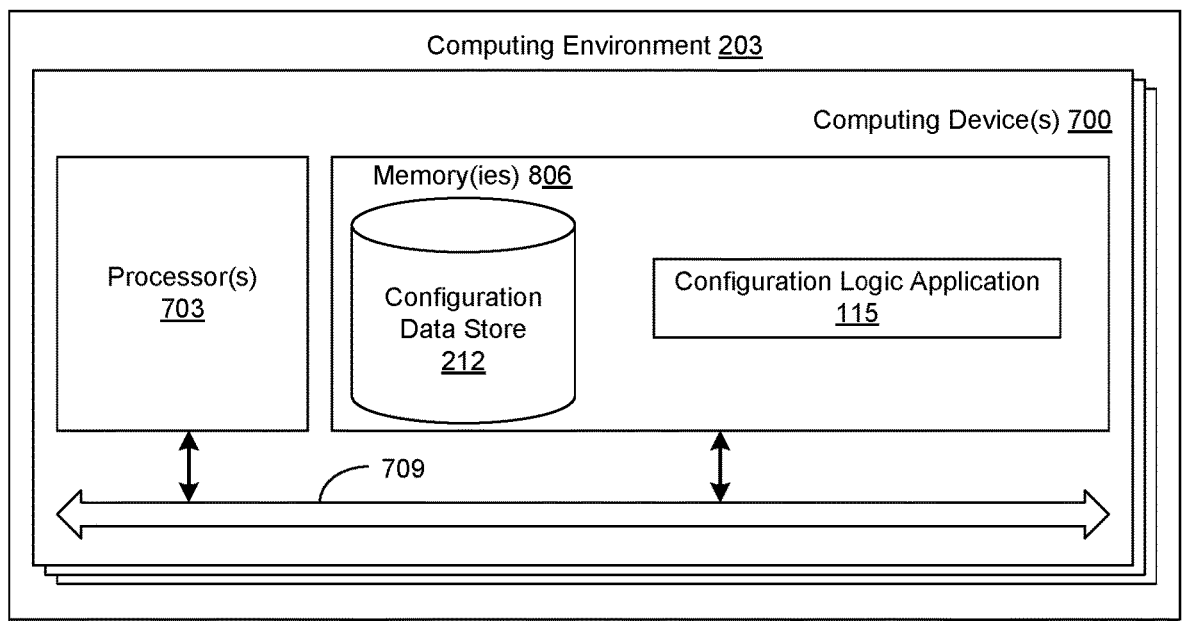
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are configuration logic application 115, and potentially other applications. Also stored in the memory 706 may be a configuration data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java °, JavaScript®, Perl, PHP, Visual Basic °, Python °, Ruby, Flash °, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the configuration logic application 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6 shows the functionality and operation of an implementation of portions of configuration logic application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the configuration logic application 115, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the configuration logic application 115, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   obtaining, via at least one computing device, a configuration specifying how to process an input to produce an output, the configuration being stored among a plurality of configurations in at least one configuration file accessible to the at least one computing device, the plurality of configurations organized in a tree data structure according to conditions associated with the input, the configuration further comprising a set of conditions for identifying the input and processing logic for generating the output in response to receiving the input, wherein the at least one configuration file is separate from code executed by the at least one computing device;
   obtaining, via at least one computing device, a request to generate a transaction record corresponding to an event, the request obtained via an application programming interface (API) configured to obtain a request transmitted to the at least one computing device;
   identifying, based at least in part upon at least one condition specified in the request, a configuration corresponding to the request, the configuration identified by identifying at least one node in the tree data structure corresponding to the at least one condition specified in the request;
   extracting, via the at least one computing device, logic specifying how to generate the transaction record corresponding to the event from the configuration corresponding to the request;
   extracting, via the at least one computing device, input validation logic from the configuration corresponding to the request;
   validating, via the at least one computing device, the request using the input validation logic; and
   generating, via the at least one computing device, the transaction record utilizing the logic from the configuration corresponding to the request.

2. The method of claim 1, wherein the logic specifying how to generate the transaction record comprises at least one value that should be embedded within the transaction record.

3. The method of claim 1, wherein the logic specifying how to generate the transaction record further comprises conditional logic, wherein the conditional logic specifies a first output in response to a first value of a particular and a different output in response to a different value of the input.

4. The method of claim 1, further comprising:
   obtaining, via the at least one computing device, a new configuration;
   identifying, via the at least one computing device, a particular node within the tree data structure based at least in part upon at least one condition specified by the new configuration; and
   storing, via the at least one computing device, the new configuration within the tree data structure within the particular node.

5. The method of claim 4, wherein the particular node is a preexisting node in the tree data structure, and the new configuration specifies an effective date on or after which the new configuration is effective.

6. A method, comprising:
   obtaining, via at least one computing device, a request to generate an output in response to an input corresponding to a transaction;
   identifying, via the at least one computing device, a configuration from among a plurality of configurations stored in a data store accessible to the at least one computing device that corresponds to the input, the configuration including at least one condition and is identified based at least in part upon the input meeting the at least one condition, wherein the plurality of configurations are further stored separate from code executed by the at least one computing device to identify the configuration, the configuration further including processing logic specifying how the output is generated from the input, the configuration further including input validation logic;
   extracting, via the at least one computing device, the processing logic and the input validation logic from the configuration;
   validating, via the at least one computing device, the request using the input validation logic;
   generating, via the at least one computing device and utilizing the processing logic from the configuration, the output corresponding to the input based at least in part upon the configuration; and
   transmitting, via the at least one computing device, the output to at least one of a downstream system or to a requesting upstream system.

7. The method of claim 6, wherein identifying the configuration further comprises identifying a particular node in a tree data structure that corresponds to the input, wherein the particular node is identified based upon the at least one condition specified by the input and wherein a first node in the tree data structure represents a parameter and a child node of the tree data structure represents a parameter value corresponding to the parameter.

8. The method of claim 7, wherein the particular node contains output logic specifying how to generate the output from the input.

9. The method of claim 7, further comprising:
   obtaining, via the at least one computing device, an updated configuration corresponding to the configuration;
   replacing, via the at least one computing device, the particular node in the tree data structure with the updated configuration; and applying, via the at least one computing device, the updated configuration at a next runtime.

10. The method of claim 9, further comprising generating, via the at least one computing device, in response to obtaining the updated configuration, a test for the configuration, the test being generated by creating at least one test input that corresponds to the at least one condition causing the configuration to be triggered.

11. The method of claim 9, wherein the updated configuration comprises an effective date on or after which the updated configuration is effective, and the method further comprises:
storing the updated configuration in association with the particular node; and
replacing the particular node on or after the effective date.

12. The method of claim 6, further comprising arranging the plurality of configurations into a tree data structure based at least in part upon a respective plurality of conditions specified by the configurations.

13. The method of claim 6, wherein the at least one condition specifies a value that must be present in a particular input.

14. A system, comprising:
at least one computing device;
a data store in communication with the at least one computing device, the data store housing a plurality of configurations; and
an application executable by the at least one computing device, wherein the application, when executed, causes the at least one computing device to at least:
obtain a request to generate an output based upon an input in the request;
identify a configuration from the plurality of configurations associated with the input based upon a plurality of conditions specified by the input, wherein the plurality of configurations are arranged in a tree based upon a relationship of the plurality of conditions to one another, the configuration further including processing logic specifying how the output is generated from the input, the configuration further including input validation logic;
extract the processing logic and the input validation logic from from the configuration;
validate the request using the input validation logic;
generate the output utilizing the processing logic; and
transmit the output to a downstream system.

15. The system of claim 14, wherein the application causes the at least one computing device to at least:
obtain a new configuration;
determine whether the new configuration corresponds to a preexisting configuration from the plurality of configurations; and
in response to the new configuration corresponding to a preexisting configuration, replace the preexisting configuration in the tree.

16. The system of claim 15, wherein the application causes the at least one computing device to at least:
generate a new configuration node in response to determining that the new configuration fails to correspond to a preexisting configuration;
determine a location within the tree for the new configuration based upon a plurality of conditions specified by the new configuration; and
store the new configuration in the tree.

17. The system of claim 14, wherein the output corresponds to a transformation of the input based upon the processing logic.

18. The system of claim 14, wherein the processing logic specifying how to generate the output identifies at least one field to append to the input.

19. The system of claim 14, wherein the application identifies the configuration associated with the input by traversing the tree to locate a particular configuration including the same ones of the plurality of conditions specified by the input.

20. The system of claim 14, wherein the application causes the at least one computing device to at least generate a test for the configuration by generating a test input having the fields corresponds to the plurality of conditions specified by the configuration.

* * * * *